(12) United States Patent  (10) Patent No.: US 9,146,405 B2
Watanabe  (45) Date of Patent: Sep. 29, 2015

(54) MANUFACTURING METHOD OF PROGRESSIVE-POWER LENS

(71) Applicant: HOYA CORPORATION, Tokyo (JP)

(72) Inventor: Takatsugu Watanabe, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 60 days.

(21) Appl. No.: 13/902,327

(22) Filed: May 24, 2013

(65) Prior Publication Data

US 2013/0335700 A1    Dec. 19, 2013

(30) Foreign Application Priority Data

May 25, 2012 (JP) ................................ 2012-119977

(51) Int. Cl.
G02C 7/02 (2006.01)
G02C 7/06 (2006.01)

(52) U.S. Cl.
CPC ............... *G02C 7/024* (2013.01); *G02C 7/068* (2013.01); *G02C 7/027* (2013.01); *G02C 2202/08* (2013.01)

(58) Field of Classification Search
CPC ........ G02C 7/024; G02C 7/068; G02C 7/027; G02C 2202/08
USPC ............. 351/159.01, 159.41–159.43, 159.46, 351/159.73–159.77
See application file for complete search history.

(56) References Cited

U.S. PATENT DOCUMENTS

| 6,948,816 B2* | 9/2005 | Yamamoto et al. ...... 351/159.06 |
| 7,832,861 B1 | 11/2010 | Lee |
| 2004/0257527 A1* | 12/2004 | Qi et al. .......................... 351/177 |
| 2009/0109396 A1* | 4/2009 | Kitani et al. ................... 351/169 |
| 2010/0283966 A1* | 11/2010 | Colas et al. .................... 351/177 |
| 2012/0086910 A1* | 4/2012 | Kato et al. ..................... 351/168 |

FOREIGN PATENT DOCUMENTS

| EP | 0 880 046 A1 | 11/1998 |
| EP | 1 835 328 A2 | 9/2007 |
| JP | A-2010-97205 | 4/2010 |
| WO | WO 97/19382 | 5/1997 |
| WO | WO 2007/023714 A1 | 3/2007 |
| WO | WO 2009/048124 A1 | 4/2009 |

OTHER PUBLICATIONS

Sep. 4, 2013 Extended Search Report issued in European Patent Application No. 13169150.3.

* cited by examiner

*Primary Examiner* — Scott J Sugarman
*Assistant Examiner* — William R Alexander
(74) *Attorney, Agent, or Firm* — Oliff PLC

(57) ABSTRACT

Provided is a manufacturing method of a progressive refractive lens including a first surface being an object side surface; a second surface being an eyeball side surface; a far vision part for viewing a far vision; a near vision part for viewing a near vision; and a progressive part for viewing an intermediate vision provided between the far vision part and the near vision part, the method including: selecting a base curve according to a near vision power in the near vision part; selecting a semi-finish lens having the base curve; and forming a surface having a progressive refractive power by processing the semi-finish lens, wherein the near vision power is obtained by adding an addition power in the progressive refractive lens to a far vision power in the far vision part.

8 Claims, 5 Drawing Sheets

A  B  C

ADDITION POWER: 0.75D
BASE CURVE: 8.00
CENTER THICKNESS: 4.2mm
UPPER EDGE: 1.9mm
LOWER EDGE: 0.6mm

ADDITION POWER: 2.00D
BASE CURVE: 8.00
CENTER THICKNESS: 5.0mm
UPPER EDGE: 2.4mm
LOWER EDGE: 0.6mm

ADDITION POWER: 3.5D
BASE CURVE: 8.00
CENTER THICKNESS: 5.8mm
UPPER EDGE: 2.9mm
LOWER EDGE: 0.6mm

FIG.2

| S/ADD | 0.75 | 1.00 | 1.25 | 1.50 | 1.75 | 2.00 | 2.25 | 2.50 | 2.75 | 3.00 | 3.25 | 3.50 |
|---|---|---|---|---|---|---|---|---|---|---|---|---|
| +8.00 | | | | | | | | | | | | |
| +7.75 | | | | | | | | | | | | |
| +7.50 | | | | | | | | | | | | |
| +7.25 | | | | | | | | | | | | |
| +7.00 | | | | | | 12.00BC ① | | | | | | |
| +6.75 | | | | | | | | | | | | |
| +6.50 | | | | | | | | | | | | |
| +6.25 | | | | | | | | | | | | |
| +6.00 | | | | | | | | | | | | |
| +5.75 | | | | | | | | | | | | |
| +5.50 | | | | | | | | | | | | |
| +5.25 | | | | | | | | | | | | |
| +5.00 | | | | | | 10.00BC ② | | | | | | |
| +4.75 | | | | | | | | | | | | |
| +4.50 | | | | | | | | | | | | |
| +4.25 | | | | | | | | | | | | |
| +4.00 | | | | | | | | | | | | |
| +3.75 | | | | | | | | | | | | |
| +3.50 | | | | | | | | | | | | |
| +3.25 | | | | | | 8.00BC ③ | | | | | | |
| +3.00 | | | | | | | | | | | | |
| +2.75 | | | | | | | | | | | | |
| +2.50 | | | | | | | | | | | | |
| +2.25 | | | | | | | | | | | | |
| +2.00 | | | | | | | | | | | | |
| +1.75 | | | | | | | | | | | | |
| +1.50 | | | | | | | | | | | | |
| +1.25 | | | | | | 6.00BC ④ | | | | | | |
| +1.00 | | | | | | | | | | | | |
| +0.75 | | | | | | | | | | | | |
| +0.50 | | | | | | | | | | | | |
| +0.25 | | | | | | | | | | | | |
| +0.00 | | | | | | | | | | | | |
| -0.25 | | | | | | | | | | | | |
| -0.50 | | | | | | | | | | | | |
| -0.75 | | | | | | | | | | | | |
| -1.00 | | | | | | 4.00BC ⑤ | | | | | | |
| -1.25 | | | | | | | | | | | | |
| -1.50 | | | | | | | | | | | | |
| -1.75 | | | | | | | | | | | | |
| -2.00 | | | | | | | | | | | | |
| -2.25 | | | | | | | | | | | | |
| -2.50 | | | | | | | | | | | | |
| -2.75 | | | | | | | | | | | | |
| -3.00 | | | | | | | | | | | | |
| -3.25 | | | | | | | | | | | | |
| -3.50 | | | | | | 3.00BC ⑦ | | | | | | |
| -3.75 | | | | | | | | | | | | |
| -4.00 | | | | | | | | | | | | |
| -4.25 | | | | | | | | | | | | |
| -4.50 | | | | | | | | | | | | |
| -4.75 | | | | | | | | | | | | |
| -5.00 | | | | | | | | | | | | |
| -5.25 | | | | | | | | | | | | |
| -5.50 | | | | | | | | | | | | |
| -5.75 | | | | | | | | | | | | |
| -6.00 | | | | | | | | | | | | |
| -6.25 | | | | | | | | | | | | |
| -6.50 | | | | | | | | | | | | |
| -6.75 | | | | | | | | | | | | |
| -7.00 | | | | | | | | | | | | |
| -7.25 | | | | | | | | | | | | |
| -7.50 | | | | | | 2.00BC ⑧ | | | | | | |
| -7.75 | | | | | | | | | | | | |
| -8.00 | | | | | | | | | | | | |
| -8.25 | | | | | | | | | | | | |
| -8.50 | | | | | | | | | | | | |
| -8.75 | | | | | | | | | | | | |
| -9.00 | | | | | | | | | | | | |
| -9.25 | | | | | | | | | | | | |
| -9.50 | | | | | | | | | | | | |
| -9.75 | | | | | | | | | | | | |
| -10.00 | | | | | | | | | | | | |

A

ADDITION POWER: 0.75D
BASE CURVE: 5.00
CENTER THICKNESS: 3.8mm
UPPER EDGE: 1.2mm
LOWER EDGE: 0.6mm

B

ADDITION POWER: 2.00D
BASE CURVE: 6.00
CENTER THICKNESS: 4.7mm
UPPER EDGE: 1.9mm
LOWER EDGE: 0.6mm

MANUFACTURING METHOD OF PROGRESSIVE-POWER LENS

BACKGROUND

1. Technical Field

The present invention relates to a manufacturing method of a progressive refractive lens, and particularly relates to the manufacturing method of a progressive refractive lens configured to select a semi-finish lens based on a base curve and apply processing to the semi-finish lens.

2. Description of Related Art

At present, in a field of a spectacle lens, various types of the spectacle lenses have been developed according to a request of a wearer, so as to respond to myopia and hyperopia. A progressive refractive lens can be given as one of such developed spectacle lenses. The progressive refractive lens has a far vision part for viewing a far vision and a near vision part for viewing a near vision. Therefore, by wearing the progressive refractive lens, the wearer can visually recognize a field from a far scenery to an object within an arm reach. Further, a progressive part for viewing an intermediate vision is provided between the far vision part and the near vision part. In this progressive part, diopter is continuously varied. Therefore, when a visual line is moved between the far vision and the near vision, move of the visual line with less strange feeling can be realized.

Similarly to a normal spectacle lens, the progressive refractive lens has a first surface being an object side surface, and a second surface being an eyeball side surface. Then, the progressive refractive lens having the progressive surface on the first surface, is called "an outer surface progressive lens". Also, the progressive refractive lens having the progressive surface on the second surface, is called "an inner surface progressive lens". Explanation is given hereafter using the spectacle lens with the first surface formed as a convex surface, and the second surface formed as a concave surface, if not being described otherwise.

The outer surface progressive lens described in patent document 1 for example, is known.

Patent document 1 describes a technique of applying a free-form processing to a surface opposed to the second surface of a semi-finish lens having a previously completed second surface (concave surface), and forming the first surface (convex surface) having a progressive refractive power. The progressive refractive power is also called a "progressive surface" hereafter.

The inner surface progressive lens described in patent documents 2 and 3 for example, is known.

As shown in line 41 to line 43 from the top of page 4 and FIG. 1, patent document 2 describes a technique of suppressing a fluctuation of a base curve showing a basic refractive power of the first surface (convex surface) by forming the progressive surface on the second surface (concave surface).

Also, patent document 3 describes the following content as a subject in a conventional art.

The inner surface progressive lens having a large addition power has a shape largely deviated from an approximately spherical shape in such a manner that a curve becomes shallow on the second surface (concave surface), thus deteriorating a wearing feeling. Further, even in a case of the inner surface progressive lens having the large addition power, the base curve on the first surface (convex surface) is set to be small. In this case, a curvature difference needs to be generated between the first surface and the second surface, so as to satisfy a condition that the addition power is large. Therefore, the convex shape (namely "rear convex") needs to be formed on the second surface (concave surface).

As the means for solving such a subject, patent document 3 describes a method of determining the base curve of the semi-finish lens, according to the addition power requested for the inner surface progressive lens. This base curve is the base curve of the first surface (convex surface) finally. According to patent document 3, as shown in table 1 and table 2 of the patent document 3, a table showing a value of an optical base curve is uniquely prepared, according to the spherical power requested for the first surface, and the addition power requested for the inner progressive lens. For example, as described in paragraph 0019 of patent document 3, a deep base curve (C-section in table 1) is set for the semi-finish lens corresponding to the addition power, although a shallow base curve (A-section in table 1) needs to be set originally. Thus, generation of the "rear convex" is avoided.

PATENT DOCUMENT

Patent document 1: Patent Publication No. WO2009/048124
Patent document 2: Patent Publication No. WO1997/019382
Patent document 3: Japanese Patent Laid Open Publication No. 2010-97205

SUMMARY OF THE INVENTION

Conventionally, when the progressive refractive power lens is manufactured, the semi-finish lens having a specific base curve is selected, and an unprocessed portion of the semi-finish lens is processed, so as to have a specific addition power. Namely, in a conventional manufacturing method of a progressive refractive lens, first, one kind of semi-finish lens is selected according to the specific base curve common in a plurality of progressive refractive lenses, even in a case of manufacturing a plurality of progressive refractive lenses. Then, such a one kind of semi-finish lens is processed into each shape, according to the addition power which should be possessed by each progressive refractive lens.

However, when the inner surface progressive lens is manufactured using the method of selecting one kind of semi-finish lens, it is found by inventors of the present invention, that various subjects are generated. These subjects are described using FIG. 1. For example, explanation is given for a case of manufacturing the following inner surface progressive lens, such as:

(a) the progressive refractive lens having spherical power: +2.50 D (diopter) (S+2.50) and addition power: 0.75 D (ADD: 0.75 D) (corresponding to FIG. 1A)
(b) the progressive refractive lens having spherical power: +2.50 D (S+2.50) and addition power: 2.00 D (ADD: 2.00 D) (corresponding to FIG. 1B)
(c) the progressive refractive lens having spherical power: +2.50 D (S+2.50) and addition power: 3.50 D (ADD: 3.50 D) (corresponding to FIG. 1C)

Note that a solid line shows an outline of the semi-finish lens, and a dot line shows an outline of the second surface scheduled to be formed in consideration of the addition power. Also, a shape portion shows the progressive refractive lens.

As described above, conventionally, even when a plurality of progressive refractive lenses are manufactured, one kind of semi-finish lens is selected, if a far vision power is common in these lenses. Therefore, the semi-finish lens suitable for the progressive refractive lens having the addition power of 3.50 D, is required to be selected. An influence thereof is specifically described hereafter. When a large addition power is required, as shown in FIG. 1C, it is necessary that the curvature difference is generated between the first surface and the second surface, to thereby earn the addition power. Note that in order to earn the addition power, it can be considered that the addition power is horizontally added in a near vision part. However, this is not preferable in the point of aberration. Of course, formation of the "rear convex" must be avoided.

In view of the above-mentioned circumstance, in order to select one kind of semi-finish lens, the base curve is required to be set to be larger than a normal base curve selected when the spherical power is S+2.50. Then, the semi-finish lens having such a large base curve is required to be selected. In this case, even in a case of manufacturing not only the progressive refractive lens having the addition power of a moderate level as shown in FIG. 1B, but also the progressive refractive lens having a small addition power as shown in FIG. 1A, the base curve of the first surface becomes unnecessarily large. As a result, as shown in FIG. 1A, any one of a center thickness, an edge thickness in an upper part (upper edge), an edge thickness in a lower part (lower edge), and a bulky state of the progressive refractive lens, or a combination thereof (also called a "thickness of the progressive refractive lens" collectively hereafter) becomes unnecessarily large, thus causing a deterioration in designability.

Therefore, an object of the present invention is to provide a manufacturing method of a progressive refractive lens capable of suppressing an unnecessary increase of a base curve, involving an increase of a thickness of the progressive refractive lens, using a relatively simple method.

SUMMARY OF THE INVENTION

Regarding a setting method of a base curve, the base curve is conventionally set, with a far vision power as a reference, as described in paragraph 0005 of patent document 1. Patent document 2 describes the base curve in line 33 to line 36 from the top of page 10, as follows: the base curve is set having a refractive power on an object-side surface, separately from an addition power. Further, patent document 2 describes the inner surface progressive lens, with a progressive surface formed on an eyeball-side surface. From this point, it is clear that in patent document 2 as well, the base curve is set based on the far vision power. The same thing can be said for patent document 3. Further, in patent document 3, although the base curve is selected according to the addition power, the base curve is simply determined according to the addition power which is basically within a framework of a specific far vision power (for example line of S+6.00 in table 1 of patent document 3).

Under such a circumstance, the inventors of the present invention estimate that there is a key for solving the above-mentioned subject in a setting method itself of the base curve as a premise. In the conventional method, the base curve is determined by the far vision power, and a shape of the progressive surface is determined by existence of a specific addition power, and a near vision part in the progressive refractive lens is formed. At this time, the influence of the base curve determined first remains deeper. As a result, the above-mentioned problem is exposed. From a different viewpoint, the above-mentioned subject can be solved before exposure, if the near vision power is reflected on the base curve from the first. As a result of focusing on this point, the inventors of the present invention achieve a method of determining the base curve not based on the far vision power or the addition power, but based on the "near vision power" as a total value after adding the addition power to the far vision power.

Preferable aspects of the present invention achieved based on the above-mentioned knowledge are as follows.

According to a first aspect of the present invention, there is provided a manufacturing method of a progressive refractive lens including a first surface being an object side surface; a second surface being an eyeball side surface; afar vision part for viewing a far vision; a near vision part for viewing a near vision; and a progressive part for viewing an intermediate vision provided between the far vision part and the near vision part, the method including:

selecting a base curve according to a near vision power in the near vision part;

selecting a semi-finish lens having the base curve; and forming a surface having a progressive refractive power by processing the semi-finish lens, wherein the near vision power is obtained by adding an addition power in the progressive refractive lens to a far vision power in the far vision part.

According to a second aspect of the present invention, there is provided the method of the first aspect, wherein when a plurality of progressive refractive lenses are manufactured with the near vision power different from each other exceeding a specific range, the base curve different from each other according to the near vision power, is selected, and the semi-finish lens different from each other according to the base curve, is selected for each progressive refractive lens, to thereby apply processing to the semi-finish lens respectively.

According to a third aspect of the present invention, there is provided the method of the first or second aspect, wherein the first surface is based on a surface having the base curve in the semi-finish lens, and the second surface is the surface having a progressive refractive power, and formed by applying processing to a surface opposed to the surface having the base curve in the semi-finish lens.

According to a fourth aspect of the present invention, there is provided the method of any one of the first to third aspects, wherein when the base curve is selected using a relational table between a spherical power and the base curve, a column of the spherical power in the relational table is referenced based on the near vision power.

According to the present invention, an unnecessary increase of the base curve, involving the increase of a thickness of the progressive refractive lens, can be suppressed by a relatively simple method.

BRIEF DESCRIPTION OF THE DRAWINGS

FIG. 1 is a schematic view of a vertical shape of a progressive refractive lens for describing a subject of the present invention, wherein FIG. 1A shows the progressive refractive lens having a spherical power of +2.5 D and an addition power of 0.75 D, and FIG. 1B shows the progressive refractive lens having the spherical power of +2.50 D and the addition power of 2.00 D, and FIG. 1C shows the progressive refractive lens having the spherical power of +2.50 D and the addition power of 3.50 D.

FIG. 2 is a relational table between the spherical power, and the addition power and the base curve in a conventional case, wherein the spherical power (far vision power) is taken on the vertical axis, and the addition power is taken on the horizontal axis.

FIG. 5 is a schematic view of a vertical shape of the progressive refractive lens according to this embodiment, wherein FIG. 5A shows the progressive refractive lens having the spherical power of +2.50 D, and the addition power of 0.75 D, and FIG. 5B shows the progressive refractive lens having the spherical power of +2.50 D, and the addition power of 2.00 D.

MODES FOR CARRYING OUT THE INVENTION

Figure 1:
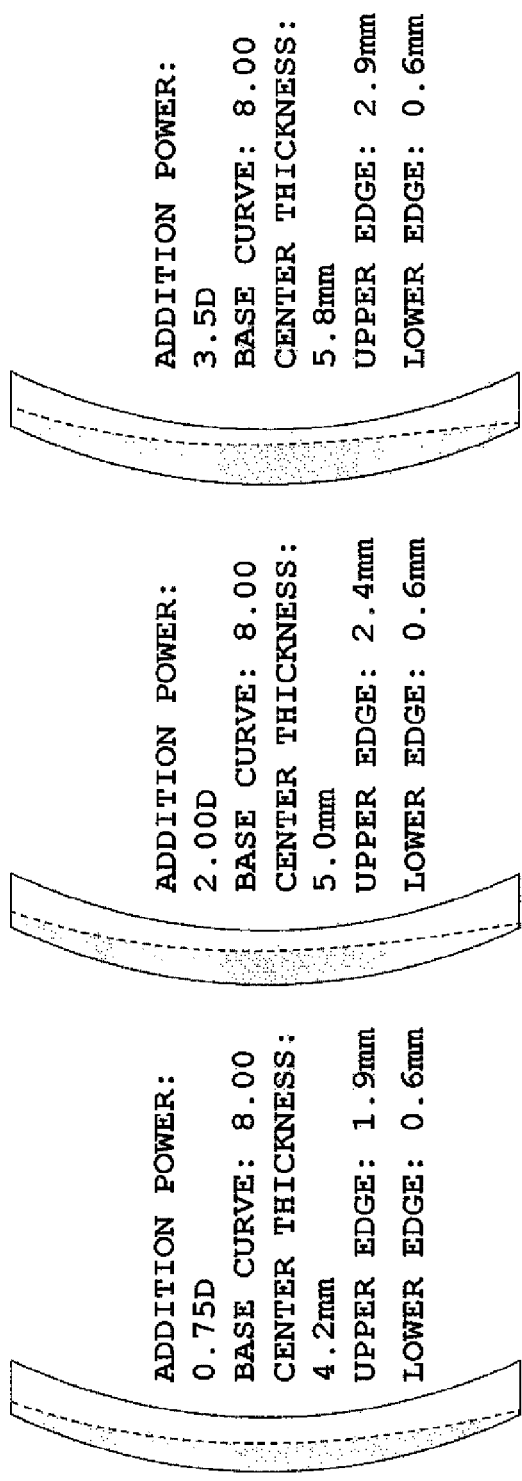

Embodiments of the present invention will be described hereafter.

This embodiment is described in the following order. Note that in this embodiment, explanation is given for a case that a progress refractive lens is used as an inner surface progressive lens. A double-sided progressive lens with both of a first surface and a second surface used as a progressive surface, is described in <4. Modified example>.

1. Manufacturing method of a progressive refractive lens
   A) Preparation of a semi-finish lens
   B) Processing to the semi-finish lens
      a) Selection of a base curve
      b) Selection of the semi-finish lens
      c) Processing to the semi-finish lens
   C) Others
2. Difference from a conventional art
3. Effect by an embodiment
4. Modified example

1. Manufacturing Method of a Progressive Refractive Lens

The progressive refractive lens of this embodiment includes a first surface being an object side surface, a second surface being an eyeball side surface, a far vision part for viewing a far vision, a near vision part for viewing a near vision, and a progressive part for an intermediate vision provided between the near vision part and the far vision part.

Further, in the manufacturing method of a progressive refractive lens, two steps of A) preparing a semi-finish lens (preparation step), and B) processing to the semi-finish lens (processing step) are mainly performed. Thereafter, various processing is performed in C) others to turn the progressive refractive lens into a product of a spectacle lens.

A) Preparation of the Semi-Finish Lens

The semi-finish lens is a base material which is a base of the progressive refractive lens. If the progressive refractive lens can be manufactured, the lens may have any kind of material (refractive index) or shape, or a publicly-known lens may be used. The semi-finish lens of this embodiment has approximately a disc shape, and a spherical shape having a specific base curve is formed at a portion being the first surface of the progressive refractive lens. Further, an unprocessed surface is formed on the surface opposed to the surface having the base curve.

Namely, the first surface of the progressive refractive lens in this embodiment is used as the surface based on the surface having the base curve in the semi-finish lens. Then, the second surface in this embodiment is used as the surface having a progressive refractive power and formed by processing the surface opposed to the surface having the base curve in the semi-finish lens. Note that in this embodiment, explanation is given for a case of using the base material having a refractive index of 1.67 as the semi-finish lens.

Further, the kind of the previously prepared semi-finish lens is given as an example, in a case that it is prepared by the number of base curves indicated in a relational table shown in FIG. 2. FIG. 2 is the relational table of a conventional case, between the spherical power, and the addition power and the base curve, wherein the spherical power (far vision power) is taken on the vertical axis, and the addition power is taken on the horizontal axis.

Note that a publicly-known manufacturing method of a semi-finish lens may be used, such as the method of a conventional art (WO2005/084885 publication) by the present applicant.

B) Processing to the Semi-Finish Lens

Next, explanation is given for a design of a shape obtained by applying processing to an unprocessed surface of the semi-finish lens. In this embodiment, the unprocessed surface of the semi-finish lens is the second surface and the progressive surface of the progressive refractive lens. In this step, first, a) selection of the base curve (base curve selection step) is performed, and thereafter based on a result thereof, b) selection of the semi-finish lens (semi-finish lens selecting step) is performed. Thereafter, c) processing to the semi-finish lens (semi-finish lens processing step) is actually performed.

a) Selection of the Base Curve

This embodiment is characterized in that the near vision power possessed by the near vision part of the progressive refractive lens, is taken into consideration for selecting the semi-finish lens. Namely, this embodiment is characterized in that the near vision power is previously reflected on the base curve which is finally a base of the first surface of the progressive refractive lens, and the base curve is selected according to the near vision power in the near vision part. Namely, it is so defined that the "near vision power" in this embodiment is obtained by adding the addition power in the progressive refractive lens, to the far vision power in the far vision part.

As a specific selection method of the base curve, for example, there is a method of using the relational table described in FIG. 11 of patent document 1 published by the present applicant. For example, when the progressive refractive lens having a specific spherical power and astigmatic power is manufactured, the spherical power of the vertical axis or the astigmatic power of the horizontal axis are reference in this relational table, to thereby obtain the number in a cell corresponding to the specific spherical power and astigmatic power as the base curve. However, conventionally, the base curve is determined based on the far vision power being the spherical power.

Figure 4:
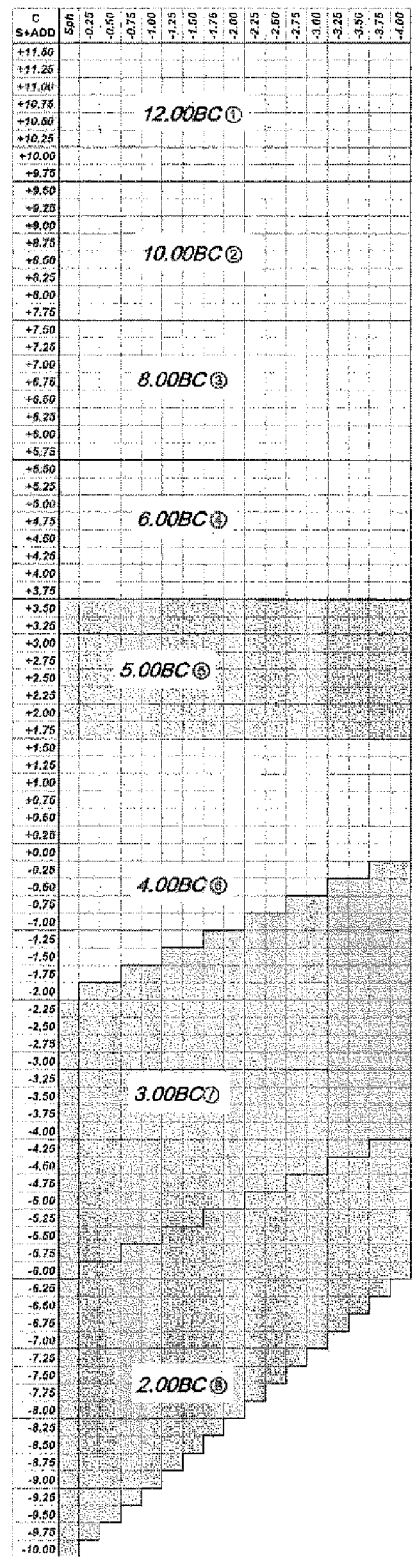
FIG. 4 is a relational table between the spherical power, and an astigmatic power and the base curve, wherein the spherical power (near vision power) is taken on the vertical axis, and the astigmatic power is taken on the horizontal axis.

Therefore, in this embodiment, a column of the spherical power in the relational table is referenced based on the "near vision power", in the column of the spherical power of the relational table between the spherical power, and the astigmatic power and the base curve. Namely, as shown in FIG. 4 (details are described later), in the column of the spherical power, not a value of the far vision power, but a numerical value obtained by adding the far vision power to the addition power (namely, the numerical value of the near vision power) is referenced. Then, the number in the cell where the column (line) of the numerical value and the column (row) of the specific astigmatic power are crossed each other, is obtained as the base curve. Note that a range of the numerical value and the numerical value in the above-mentioned relational table, may be suitably determined by a manufacturer. In a case of a dense range of the numerical values, the progressive refractive lens having an optimal shape excellent in an optical performance, can be manufactured. In a case of a sparse range of the numerical values, the kind of the prepared semi-finish lenses can be reduced, and a cost and a stock burden can be reduced.

It is also acceptable to use a method of renewing the number in the cell to a suitable numerical value corresponding to the manufactured progressive refractive lens in the relational table between the spherical power, and the astigmatic power and the base curve. If the above-mentioned existing relational table is used, there is no necessity for preparing the relational table from the first, and a load added on the manufacturer can be reduced. Meanwhile, if the above-mentioned relational table is renewed, an optimal base curve can be selected while complying with an actual manufacturing condition.

Figure 3:
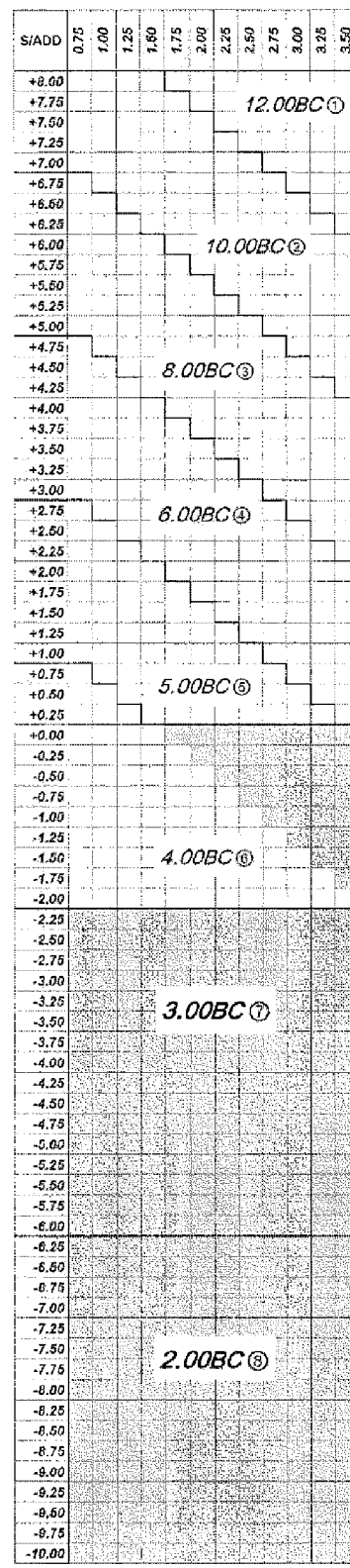
FIG. 3 is a relational table between the spherical power, and the addition power and the base curve in this embodiment, wherein the spherical power (far vision power) is taken on the vertical axis, and the addition power is taken on the horizontal axis.

When the above-mentioned relational table is newly prepared, tables as shown in FIG. 3 and FIG. 4 are obtained. FIG. 3 is the relational table between the spherical power, and the addition power and the base curve according to this embodiment, wherein the spherical power (far vision power) is taken on the vertical axis, and the addition power is taken on the horizontal axis.

When comparing the above-mentioned FIG. 3 and FIG. 2 which is a conventional relational table between the spherical power, and the addition power and the base curve, the characteristic of this embodiment is clarified. Namely, in FIG. 3 of this embodiment, the base curve is changed if (far vision power+addition power) namely the near vision power is changed exceeding a specific range.

FIG. 4 is prepared based on FIG. 3. FIG. 4 is the relational table between the spherical power, and the astigmatic power and the base curve according to this embodiment, wherein the spherical power (near vision power) is taken on the vertical axis, and the astigmatic power is taken on the horizontal axis. In this embodiment, the base curve is determined based on FIG. 4.

b) Selection of the Semi-Finish Lens

After the base curve is selected by the above-mentioned method, the semi-finish lens having this base curve is selected this time. Unlike a conventional method, in this embodiment, it is not the case that one kind of semi-finish lens is used because it has a common far vision power. In this embodiment, the base curve is selected according to the near vision power. Therefore, when a plurality of progressive refractive lenses are manufactured, the base curve different from each other according the near vision power, is selected for each progressive refractive lens, when the near vision power is different from each other exceeding the specific range. Then, the semi-finish lens different from each other according to the base curve, is selected. Note that the above-mentioned specific range may be suitably determined by the manufacturer, similarly to the range of the numerical values and the numerical values in the above-mentioned relational table.

Figure 5:
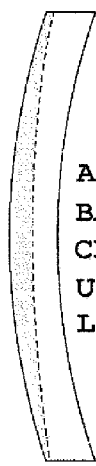
Figure 5:
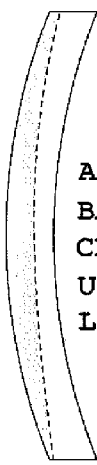

Here, explanation is given using FIG. 5 for a case that a specific example (FIG. 1) described in the subject of the present invention, is applied to this embodiment. FIG. 5 is a schematic view of a vertical shape of the progressive refractive lens according to this embodiment, wherein FIG. 5A shows the progressive refractive lens having the spherical power of +2.50 D and the addition power of 0.75 D, and FIG. 5B shows the progressive refractive lens having the spherical power of +2.50 D and the addition power of 2.00 D.

In FIG. 5B, the near vision power is 2.5 D+2.00 D=+4.50 D. Then, in the column of the spherical power of the relational table, the line of +4.50 D is referenced. Then, the base curve described in the cell crossing the row of the specific astigmatic power, is used. Unlike the case of FIG. 1, there is no necessity for obtaining the base curve larger than a normal base curve selected in the case of S+4.50.

In FIG. 5A, the near vision power is expressed by 2.50 D+0.75 D=+3.25 D. As a result, in the column of the spherical power in the relational table of FIG. 4, the line of +3.25 D is referenced. Unlike a conventional case, in this embodiment, another kind of semi-finish lens is used, even in the case of the same far vision power. Therefore, the base curve according to +3.25 D may be used. As a result, in the progressive refractive lens shown in FIG. 5A of this embodiment, the base curve can be set to be smaller than the base curve of the conventional progressive refractive lens shown in FIG. 1A. Accordingly, a thickness of the progressive refractive lens (namely, any one of a center thickness, an edge thickness in an upper part (upper edge), an edge thickness in a lower part (lower edge), and a bulky state of the progressive refractive lens, or a combination thereof) can be set to be small. The same thing can be said for FIG. 5B and FIG. 1B. In addition, it can also be said that the smaller the addition power is, the higher the effect can be exhibited. Therefore, regarding the addition power of the progressive refractive lens of this embodiment, there is an effect of reducing the base curve, for example when the spherical power (far vision power) S is +2.50 and the addition power is 3.00 or less, and particularly has the effect of reducing the base curve when the addition power is 1.00 or less. In FIG. 2 and FIG. 3, as is clarified from a comparison between different columns of the addition power although the spherical power (far vision power) is the same, it is obvious that the base curve of this embodiment can be set to be smaller than the conventional base curve when the addition power is 3.00 D or less. Further, the base curve of this embodiment can be set to be remarkably smaller than the conventional base curve when the addition power is 1.00 D or less. This can be confirmed by comparing FIG. 1A and FIG. 5A.

Further, as described above, FIG. 3 is the relational table newly prepared in this embodiment, wherein the base curve is fixed irrespective of the addition power, when the spherical power (far vision power) S is less than −2.00. Namely, in FIG. 2 and FIG. 3, a shade portion in which S is less than −2.00, is the portion in which the base curve is fixed irrespective of the addition power. Note that in FIG. 3, the shade portion in which S is −1.75 to +0.00, corresponds to the shade portion in which the near vision power (S+ADD) is +1.75 to +3.50 in FIG. 4. At least in this embodiment, the far vision power S is preferably +0.25 or more. Under this condition, the effect of reducing the base curve can be easily obtained. Of course, this effect can be increased, by setting the addition power in the above-mentioned range.

c) Processing to the Semi-Finish Lens

Processing is performed to an unprocessed surface of the semi-finish lens selected by the above-mentioned method, to thereby form the second surface as the progressive surface. In this processing as well, a publicly-known lens may be used similarly to the manufacturing method of a semi-finish lens. As such a technique, for example a conventional technique by the present applicant described in (WO2005/084885 publication) or patent document 1 (WO2009/048124 publication) can be given. In this processing, grinding and polishing are applied to the semi-finish lens.

C) Other various steps are performed to the progressive refractive lens having the first surface and the second surface formed thereon. For example, a surface inspection, dying, formation of a hard-coat film, formation of an antireflection film, an optical inspection for a lens, an outer appearance inspection, marking, beveling, and cleaning, etc., are performed. Thus, the progressive refractive lens of this embodiment is manufactured.

2. Difference from the Conventional Technique

Explanation is given for the difference between this embodiment and the conventional technique (particularly the technique described in patent document 3). In this embodiment, when the base curve is selected, the base curve is selected based on the "near vision power". Meanwhile, in the conventional technique, the base curve is selected based on the "far vision power". Also, in patent document 3, the base curve is selected based on the "addition power".

The near vision power is surely obtained by adding the addition power to the far vision power. Therefore, it appears that in this embodiment as well, the base curve is selected based on the addition power. However, according to this embodiment, the base curve is selected based on a power (power after adding the far vision power to the addition power) of a portion being the near vision part finally.

If a plurality of progressive refractive lenses having same near vision power and different addition power are manufactured using the technique of patent document 3, a different kind of semi-finish lens is required to be used. In patent document 3, a main factor of selecting the base curve is the far vision power, and the addition power is added as a supplementary factor of selecting the base curve, in the meaning of adding an adjustment.

Meanwhile, in this embodiment, a cause for making the base curve unnecessarily deep, or forming the "rear convex" in some cases, is eliminated from the first. Namely, not the addition power being a fluctuation factor is taken into consideration in addition to the already determined far vision power, but the near vision power on which the fluctuation factor is reflected from the first, is used as the base of selecting the base curve. Thus, generation itself of the above-mentioned various problems can be suppressed. This is completely different from a concept of the conventional technique such that a generation level of the various problems is suppressed on the assumption that such problems are generated.

Note that in patent document 3, the base curve is determined according to the addition power. However, from table 1 and table 2 of the patent document 3, it is found that when the base curves of A to D sections are compared with the base curves of a conventional example, the difference in base curves is 1.0 or around at largest. Similarly, from table 1 and table 2, it is found that even in a case of manufacturing the progressive refractive lens having the addition power which is different from each other by 3.00 D, the difference in base curves is only 3.00 D or around. Therefore, it cannot be said that the above-mentioned base curve is unnecessarily increased, involving the increase of the thickness of the progressive refractive lens.

Further, if the patent document 3 and this embodiment are the same, the near vision power is the same between the case of "S+2.00, and ADD is 2.00 D" and the case of "S+1.00 and ADD is 3.00", and therefore the base curve is also required to be the same. However, the number (base curve: 4.8) in the cell where S+2.00 and the B-section are crossed each other in table 1 of the patent document 3, and the number (base curve: 5.2) in the cell where S+1.00 and the C-section are crossed each other, are different from each other.

As described above, this embodiment is achieved based on a completely different technical concept from the conventional technique (particularly patent document 3), and both of them are completely different from each other in their specific contents.

3. Effect of the Embodiment

According to this embodiment, following effects can be exhibited.

First, since the base curve is selected according to the near vision power, there is no necessity for using one kind of semi-finish lens even in the case of the same far vision power. Therefore, the semi-finish lens having the base curve suitable for each progressive refractive lens can be respectively selected, irrespective of large/small of the addition power.

Further, by selecting the base curve according to the near vision power, the above-mentioned various problems can be solved before exposure, the problems being generated when the base curve is selected based on the far vision power as conventional and then the addition power is taken into consideration.

Particularly, when the progressive refractive lens having a small addition power is manufactured, the base curve of the first surface can be set to be extremely small, thus making it possible to set the thickness of the progressive refractive lens to be smaller than conventional. As a result, the wearing feeling and designability can be further improved, compared with a conventional case.

In addition, the existing relational table as shown in FIG. 11 of the patent document 1 can be used in the method of this embodiment. As a result, the load added on the manufacturer can be reduced. Further, by only referencing the relational table, the base curve required for the progressive refractive lens can be selected. At this time, the increase of the thickness of the progressive refractive lens can be suppressed.

As described above, according to this embodiment, there is provided the manufacturing method of the progressive refractive lens capable of suppressing the unnecessary increase of the base curve, involving the increase of the thickness of the progressive refractive lens, by a relatively simple method.

4. Modified Example

The technical range of the present invention is not limited to the above-mentioned embodiment, and includes a mode in which various modifications or improvement is added, within a range of deriving a specific effect obtained by constituting features of the invention or a combination thereof.

First, the present invention is not limited to a case of manufacturing a plurality of progressive refractive lenses having the near vision power different from each other exceeding the specific range, as described above. Namely, even in the case of manufacturing the plurality of progressive refractive lenses with the near vision power set in the specific range, the technical concept of the present invention can be applied. Of course, even in the case of manufacturing a single progressive refractive lens, the technical concept of the present invention can be applied. In conclusion, the technical concept of the present invention can be applied, provided that the base curve is selected according to the near vision power.

As described above, explanation is given for the case that the progressive refractive lens is the inner surface progressive lens. However, the technical concept of the present invention can also be applied to a double side progressive lens or an outer surface progressive lens. However, as described in the subject of the present invention, the above-mentioned method is particularly effective for solving the subject generated by using the second surface as the progressive surface.

Further, preferably the first surface of the progressive refractive lens is used as the surface based on the surface having the base curve in the semi-finish lens, and the second surface is used as the progressive surface formed by processing the surface opposed to the surface having the base curve in the semi-finish lens. However, as described above, the technical concept of the present invention can be applied to the double side progressive lens and the outer surface progressive lens. Therefore, it is also acceptable that the above-mentioned arrangement is reversed. Further, the surface opposed to the surface having the base curve in the semi-finish lens may be the unprocessed surface, or may be the surface to which certain processing is applied.

Further, when the double side progressive lens is manufactured, the surface having the base curve in the semi-finish lens is further processed, to obtain the progressive surface. Namely, the "surface based on the surface having the base curve in the semi-finish lens" includes a state of the surface having the base curve as it is, or includes the surface processed into a certain shape (for example, processed so as to be the progressive surface).

Further, as described above, the relational table between the spherical power, and the astigmatic power and the base curve, is used, wherein the spherical power is taken on the vertical axis, and the astigmatic power is taken on the horizontal axis. Meanwhile, another parameter may also be used instead of the astigmatic power, or the relational table of one-to-one of the spherical power (near vision power) and the base curve may also be prepared depending on the case. Namely, the "relational table between the spherical power and the base curve" may be acceptable, provided that this is the table for grasping at least the relation between the spherical power and the base curve. Note that the relational table is not limited to the above-mentioned form, and may be a chart form as shown in FIG. 3 and FIG. 4, or may be other form such as a viewable graph form.

What is claimed is:

1. A manufacturing method of a progressive refractive lens comprising a first surface being an object side surface; a second surface being an eyeball side surface; a far vision part for viewing a far vision; a near vision part for viewing a near vision; and a progressive part for viewing an intermediate vision provided between the far vision part and the near vision part, the method comprising:
    selecting one base curve corresponding to a near vision power in the near vision part;
    selecting a semi-finish lens having the base curve; and
    forming a surface having a progressive refractive power by processing the semi-finish lens,
    wherein the near vision power is obtained by adding an addition power in the progressive refractive lens to a far vision power in the far vision part, and the base curve is selected solely based on the near vision power.

2. The method of claim 1, wherein when a plurality of progressive refractive lenses are manufactured having a difference near vision power exceeding a specific range, different base curves corresponding to each near vision power are selected, and different semi-finish lenses having the different base curves are selected for each progressive refractive lens.

3. The method of claim 1, wherein the first surface is based on a surface having the base curve in the semi-finish lens, and the second surface is the surface having a progressive refractive power, and formed by applying processing to a surface opposed to the surface having the base curve in the semi-finish lens.

4. The method of claim 1, wherein when the base curve is selected using a relational table between a spherical power and the base curve, a column of the spherical power in the relational table is referenced based on the near vision power.

5. The method of claim 2, wherein for each progressive refractive lens:
    the first surface is based on a surface having the base curve in the semi-finish lens, and the second surface is the surface having a progressive refractive power, and formed by applying processing to a surface opposed to the surface having the base curve in the semi-finish lens.

6. The method of claim 2, wherein for each progressive refractive lens:
    when the base curve is selected using a relational table between a spherical power and the base curve, a column of the spherical power in the relational table is referenced based on the near vision power.

7. The method of claim 3, wherein when the base curve is selected using a relational table between a spherical power and the base curve, a column of the spherical power in the relational table is referenced based on the near vision power.

8. The method of claim 5, wherein for each progressive refractive lens:
    when the base curve is selected using a relational table between a spherical power and the base curve, a column of the spherical power in the relational table is referenced based on the near vision power.

* * * * *